US010798337B2

(12) United States Patent
Ichiboshi et al.

(10) Patent No.: US 10,798,337 B2
(45) Date of Patent: Oct. 6, 2020

(54) COMMUNICATION DEVICE, COMMUNICATION SYSTEM, AND NON-TRANSITORY COMPUTER READABLE MEDIUM STORING PROGRAM

(71) Applicant: FUJI XEROX CO., LTD., Tokyo (JP)

(72) Inventors: Akira Ichiboshi, Kanagawa (JP); Roshan Thapliya, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/006,853

(22) Filed: Jun. 13, 2018

(65) Prior Publication Data

US 2019/0110022 A1 Apr. 11, 2019

(30) Foreign Application Priority Data

Oct. 6, 2017 (JP) ................. 2017-195602

(51) Int. Cl.
*H04N 7/14* (2006.01)
*G06K 9/00* (2006.01)
*G10L 25/63* (2013.01)
*G10L 15/22* (2006.01)
*G10L 15/08* (2006.01)
*H04N 7/15* (2006.01)

(52) U.S. Cl.
CPC ......... *H04N 7/147* (2013.01); *G06K 9/00751* (2013.01); *G10L 15/08* (2013.01); *G10L 15/22* (2013.01); *G10L 25/63* (2013.01); *H04N 7/142* (2013.01); *H04N 7/15* (2013.01); *G06K 9/00315* (2013.01); *G06K 9/00892* (2013.01); *G06K 2009/00939* (2013.01); *G10L 2015/088* (2013.01)

(58) Field of Classification Search
CPC combination set(s) only.
See application file for complete search history.

(56) References Cited

U.S. PATENT DOCUMENTS 9,843,768 B1 * 12/2017 Negi .................. H04N 7/15
2011/0072037 A1 * 3/2011 Lotzer ................ G11B 27/034
707/769

(Continued)

FOREIGN PATENT DOCUMENTS

JP 4604173 12/2010

*Primary Examiner* — Phung-Hoang J Nguyen
(74) *Attorney, Agent, or Firm* — JCIPRNET

(57) ABSTRACT

A communication device includes a reproduction section that reproduces a voice and/or a video received from an utterer device, a detection section that detects feature information indicating a psychological state of an audience listening to the voice and/or watching the video of the utterer reproduced by the reproduction section, an estimation section that estimates the psychological state of the audience based on the feature information detected by the detection section, an extraction section that extracts a factor changing the psychological state, from contents of the voice or the video which are being reproduced at a time point at which the psychological state of the audience, which is estimated by the estimation section is changed, and a transmission section that transmits the psychological state of the audience, which is estimated by the estimation section, and the factor extracted by the extraction section in association with each other, to the utterer device.

20 Claims, 8 Drawing Sheets

| TIME POINT IN CALL BASE 100B | RECOGNIZED KEYWORD | PSYCHOLOGICAL STATE IN CALL BASE 100B | FEEDBACK INFORMATION |
|---|---|---|---|
| 13:00:00:500 | | NORMAL | [{"TIME POINT": "13:00:00:500", "KEYWORD": "", "KEY FRAME": "130000000", "PSYCHOLOGICAL STATE": "NORMAL", "ID": "h0001"}] |
| 13:00:01:500 | QUALITY IMPROVEMENT | EXCITEMENT | [{"TIME POINT": "13:00:01:500", "KEYWORD": "QUALITY IMPROVEMENT", "KEY FRAME": "130001000", "PSYCHOLOGICAL STATE": "EXCITEMENT", "ID": "h0001"}] |
| 13:00:02:500 | | EXCITEMENT | [{"TIME POINT": "13:00:02:500", "KEYWORD": "", "KEY FRAME": "130002000", "PSYCHOLOGICAL STATE": "EXCITEMENT", "ID": "h0001"}] |
| 13:00:03:500 | | NORMAL | [{"TIME POINT": "13:00:03:500", "KEYWORD": "", "KEY FRAME": "130003000", "PSYCHOLOGICAL STATE": "NORMAL", "ID": "h0001"}] |

(56) References Cited

U.S. PATENT DOCUMENTS

| | | | | |
|---|---|---|---|---|
| 2013/0242030 | A1* | 9/2013 | Kato | H04L 65/403 |
| | | | | 348/14.07 |
| 2014/0242955 | A1* | 8/2014 | Kang | G06F 17/289 |
| | | | | 455/414.1 |
| 2015/0153929 | A1* | 6/2015 | Bernstein | G06F 3/0481 |
| | | | | 715/781 |
| 2016/0379640 | A1* | 12/2016 | Joshi | G10L 15/265 |
| | | | | 704/235 |
| 2017/0149709 | A1* | 5/2017 | Lampkin | H04L 51/32 |
| 2017/0193119 | A1* | 7/2017 | Unni | H04L 67/02 |
| 2017/0300291 | A1* | 10/2017 | Lee | G06F 3/165 |
| 2017/0364484 | A1* | 12/2017 | Hayes | G10L 25/63 |
| 2018/0196786 | A1* | 7/2018 | Kim | H04B 1/3833 |
| 2018/0211265 | A1* | 7/2018 | Natarajan | G06Q 30/0202 |

* cited by examiner

FIG. 6

| TIME POINT IN CALL BASE 100B | RECOGNIZED KEYWORD | PSYCHOLOGICAL STATE IN CALL BASE 100B | FEEDBACK INFORMATION |
|---|---|---|---|
| 13:00:00:500 | | NORMAL | [{"TIME POINT": "13:00:00:500", "KEYWORD": "", "KEY FRAME": "130000000", "PSYCHOLOGICAL STATE": "NORMAL", "ID": "h0001"}] |
| 13:00:01:500 | QUALITY IMPROVEMENT | EXCITEMENT | [{"TIME POINT": "13:00:01:500", "KEYWORD": "QUALITY IMPROVEMENT", "KEY FRAME": "130001000", "PSYCHOLOGICAL STATE": "EXCITEMENT", "ID": "h0001"}] |
| 13:00:02:500 | | EXCITEMENT | [{"TIME POINT": "13:00:02:500", "KEYWORD": "", "KEY FRAME": "130002000", "PSYCHOLOGICAL STATE": "EXCITEMENT", "ID": "h0001"}] |
| 13:00:03:500 | | NORMAL | [{"TIME POINT": "13:00:03:500", "KEYWORD": "", "KEY FRAME": "130003000", "PSYCHOLOGICAL STATE": "NORMAL", "ID": "h0001"}] |

COMMUNICATION DEVICE, COMMUNICATION SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2017-195602 filed Oct. 6, 2017.

BACKGROUND

Technical Field

The present invention relates to a communication device, a communication system, and a non-transitory computer readable medium storing a program.

SUMMARY

According to an aspect of the invention, there is provided a communication device which includes a reproduction section that reproduces a voice and/or a video received from a device of an utterer, a detection section that detects feature information indicating a psychological state of an audience who is listening to the voice and/or watching the video of the utterer reproduced by the reproduction section, an estimation section that estimates the psychological state of the audience based on the feature information detected by the detection section, an extraction section that extracts a factor changing the psychological state, from contents of the voice or the video which are being reproduced at a time point at which the psychological state of the audience, which is estimated by the estimation section, is changed, and a transmission section that transmits the psychological state of the audience, which is estimated by the estimation section, and the factor extracted by the extraction section in association with each other, to the device of the utterer.

BRIEF DESCRIPTION OF THE DRAWINGS

Exemplary embodiment (s) of the present invention will be described in detail based on the following figures, wherein:

FIG. 6 is a diagram illustrating contents of feedback information transmitted from the second call terminal device 20B to a first call terminal device 20A in the exemplary embodiment of the invention;

DETAILED DESCRIPTION

Figure 1:
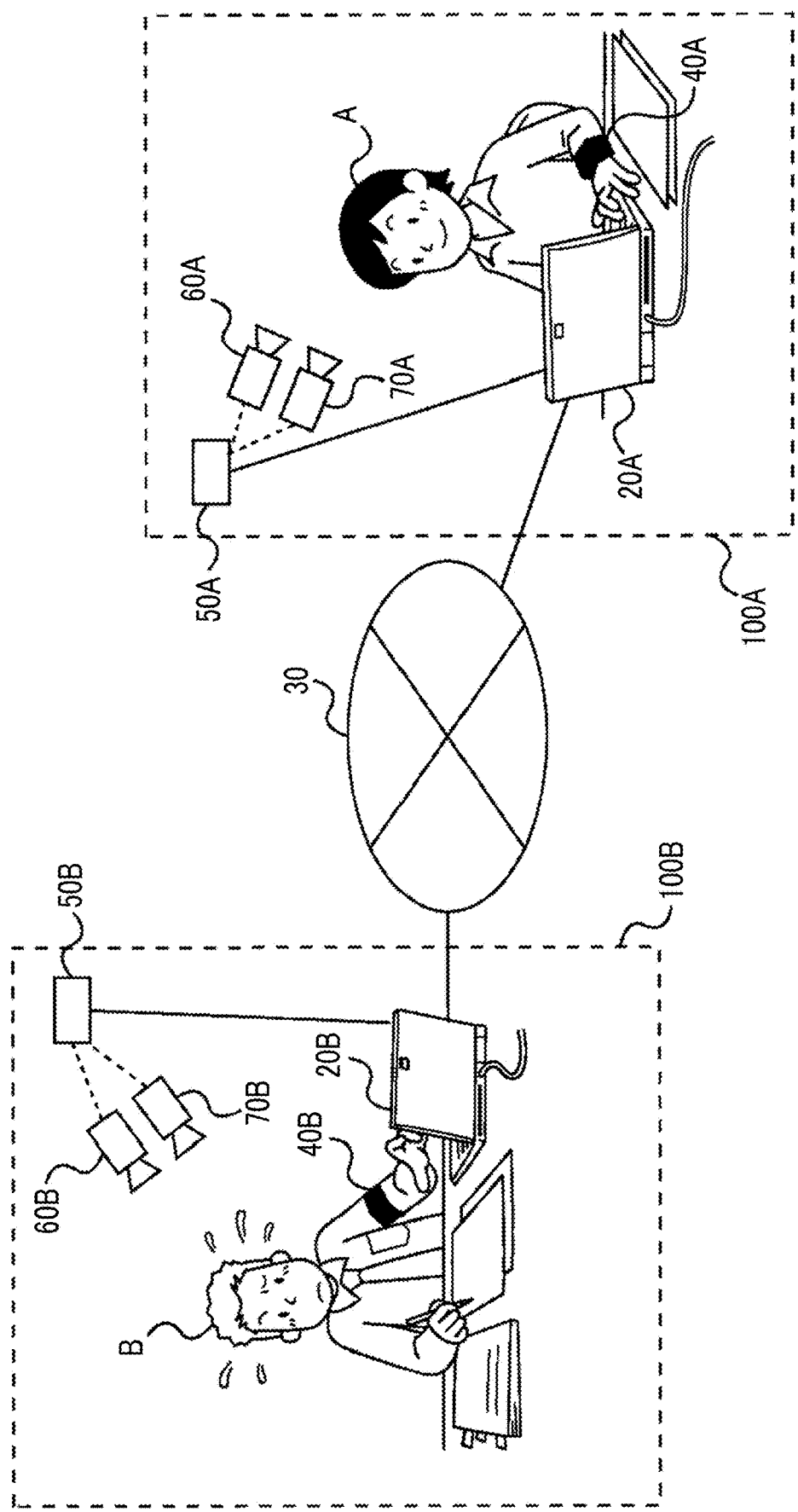
FIG. 1 is an overall schematic diagram illustrating an example of a video call system 10 according to an exemplary embodiment of the invention.

A video call system 10 according to an exemplary embodiment will be described with reference to FIG. 1. FIG. 1 is an overall schematic diagram illustrating an example of the video call system 10 in the exemplary embodiment. In the video call system 10, a call between a first user (utterer) A in a first calling base 100A and a second user (audience) B in a second calling base 100B is realized by a first call terminal device 20A, a second call terminal device 20B, and a network 30 such as the Internet.

The first call terminal device 20A is installed in the first calling base 100A and is connected to the network 30. A first access point 50A, a first thermal camera 60A, and a first depth camera 70A are provided in the first calling base 100A. The first thermal camera 60A and the first depth camera 70A are connected to the first call terminal device 20A via the first access point 50A. A first biometric sensor 40A is attached to the arm of the first user A and is wirelessly connected to the first call terminal device 20A via the first access point 50A.

Similarly, the second call terminal device 20B is installed in the second calling base 100B and is connected to the network 30. A second access point 50B, a second thermal camera 60B, and a second depth camera 70B are provided in the second calling base 100B. The second thermal camera 60B and the second depth camera 70B are connected to the second call terminal device 20B via the second access point 50B. A second biometric sensor 40B is attached to the arm of the second user B and is wirelessly connected to the second call terminal device 20B via the second access point 50B.

The configuration of the above-described first calling base 100A is substantially the same as the configuration of the above-described second calling base 100B. Thus, in the following descriptions, when the common configuration or the common operation between the first call terminal device 20A and the second call terminal device 20B will be described, descriptions will be made on the assumption that the first call terminal device 20A and the second call terminal device 20B are simply referred to as a call terminal device 20. Similarly, descriptions will be made on the assumption that the first biometric sensor 40A and the second biometric sensor 40B are simply referred to as a biometric sensor 40, the first access point 50A and the second access point 50B are simply referred to as an access point 50, the first thermal camera 60A and the second thermal camera 60B are simply referred to as a thermal camera 60, and the first depth camera 70A and the second depth camera 70B are simply referred to as a depth camera 70.

Figure 2:
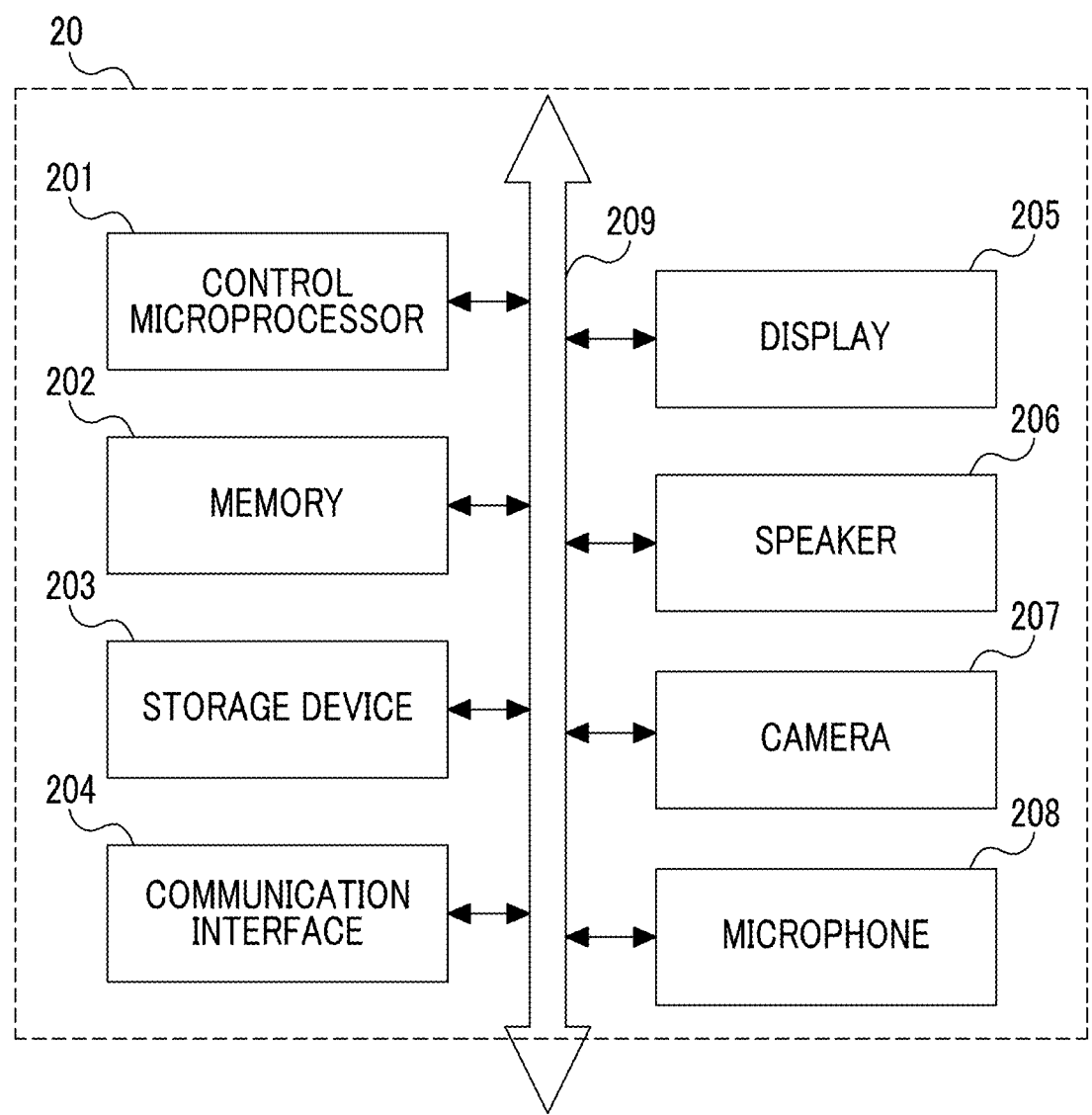
FIG. 2 is a diagram illustrating a hardware configuration of a call terminal device 20 in the exemplary embodiment of the invention.

Next, the configuration and the function of the call terminal device 20 will be described with reference to FIGS. 2 and 3. The call terminal device 20 is a terminal device such as a laptop personal computer or a smartphone, for example. FIG. 2 is a diagram illustrating a hardware configuration of the call terminal device 20 in the exemplary embodiment.

As illustrated in FIG. 2, the call terminal device 20 includes a control microprocessor 201, a memory 202, a storage device 203, a communication interface 204, a display 205, a speaker 206, a camera 207, and a microphone 208 and the above components are connected to a control bus 209.

The control microprocessor 201 controls an operation of each unit of the call terminal device 20, based on a control program stored in the storage device 203.

Information as follows is temporarily stored in the memory 202: an image or a video obtained by imaging of the camera 207 in the call terminal device 20; a voice of a user, which is detected by the microphone 208; key frame information of a video reproduced by a reproduction unit (which will be described later) of the call terminal device 20; a keyword extracted from the reproduced voice; biometric information of the user, which is detected by the biometric sensor 40 or the thermal camera 60; and external appearance information of the user, which is detected by the depth camera 70.

The storage device 203 is configured by a hard disk (HDD) or a solid state drive (SSD). The control program of controlling each unit of the call terminal device 20 is stored in the storage device.

The communication interface 204 performs communication control of causing the call terminal device 20 to communicate with a call terminal device 20 (for example, second call terminal device 20B in a case where the above device is the first call terminal device 20A) of a calling counterpart via a network. Further, the communication interface 204 performs communication control in a case where the call terminal device 20 acquires required information from the biometric sensor 40, the thermal camera 60, and the depth camera 70 via the access point 50.

The display 205 is configured by a liquid crystal display. An image received from the call terminal device 20 of the calling counterpart is displayed in the display by the reproduction unit which will be described later.

The speaker 206 outputs a voice received from the call terminal device 20 of the calling counterpart, by control of the reproduction unit which will be described later.

The camera 207 performs imaging of a user (first user A in a case where this call terminal device 20 is the first call terminal device 20A) in a form of a motion image. The obtained image is transmitted to the call terminal device 20 of the calling counterpart by a transmission unit which will be described later. The camera 207 performs imaging of a facial expression or behavior of the user and the obtained image is stored in the memory 202.

The microphone 208 detects a voice of a user (first user A in a case where this call terminal device 20 is the first call terminal device 20A). The detected voice is stored in the memory 202 and is transmitted to the call terminal device 20 of the calling counterpart by the transmission unit which will be described later. Contents of a voice, the pitch of sound, the speed of speech, and the like after the voice has been interpreted may be stored in the memory 202 instead of directly recording the voice.

In the call terminal device 20, a case where the camera 207 and the microphone 208 are incorporated in the call terminal device 20 so as to be integrated is described. However, the invention is not limited thereto. A configuration in which the main body of the call terminal device 20 is separate from the camera 207 or the microphone 208, and the camera 207 and the microphone 208 are connected to the main body of the call terminal device 20 in a wired or wireless manner may be made.

Figure 3:
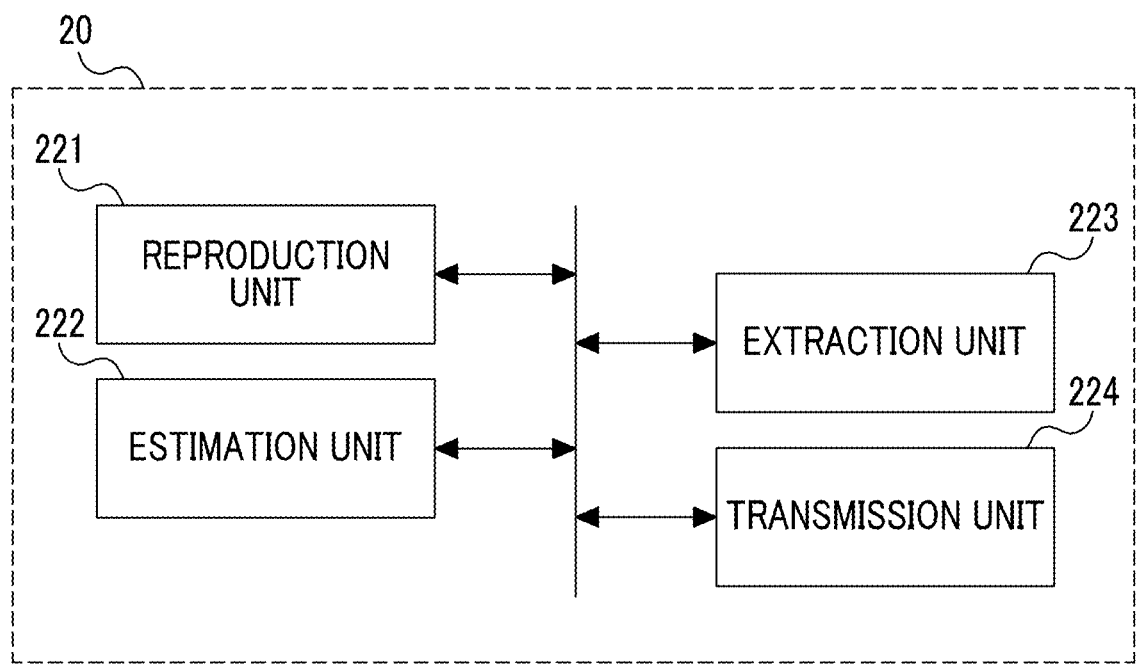
FIG. 3 is a functional block diagram of the call terminal device 20 in the exemplary embodiment of the invention.

FIG. 3 is a functional block diagram illustrating the call terminal device 20 in the exemplary embodiment. As illustrated in FIG. 3, the call terminal device 20 functions as a reproduction unit 221, an estimation unit 222, an extraction unit 223, and a transmission unit 224 by the control microprocessor 201 executing the control program stored in the storage device 203.

The reproduction unit 221 performs control of reproducing a voice and/or a video received from the call terminal device 20 (second call terminal device 20B used by a second user B in a case where the above call terminal device 20 is the first call terminal device 20A) of a calling counterpart in a video call. Thus, the reproduction unit displays the video in the display 205 or outputs the voice to the speaker 206. The reproduction unit 221 performs control of displaying feedback information (which has been received from the call terminal device 20 of the calling counterpart and will be described later) in the display 205.

The estimation unit 222 estimates a psychological state of a user as an audience, based on feature information which is detected by the camera 207, the microphone 208, the biometric sensor 40, the thermal camera 60, and the depth camera 70 and indicates indicating the psychological state of the user as the audience. The feature information indicating the psychological state of the user includes biometric information and external appearance information. The biometric information includes the skin potential, the skin resistance value, the heart rate, and the body temperature of the user, which are transmitted from the biometric sensor 40, the heat distribution of the face or the body of the user, which is detected by the thermal camera 60, the tone of a voice of the user, which is detected by the microphone 208, for example. The external appearance information includes the facial expression obtained by using positions of landmarks of the face, such as eyebrows, cheeks, and lips of the user, and a motion (for example, "being bent backward", "being bent forward", and "being raising a hand") of the body of the user, which has been acquired by the depth camera 70. The positions of the landmarks of the face are obtained by imaging of the camera 207. The estimation unit 222 estimates the psychological state of the user as an audience, at each preset time interval. A method of estimating the psychological state of the user by the estimation unit 222 will be described later in detail.

The extraction unit 223 extracts a keyword indicating contents of a voice of a user (second user B in a case where the above call terminal device 20 is the first call terminal device 20A) as a calling counterpart who is an utterer, from contents of the voice which is being reproduced at that time point, or extracts a keyword indicating behavior of the user as the calling counterpart who is an utterer, from contents of the video at each preset time interval. Even in a case where the psychological state of the user as the audience, which has been estimated by the estimation unit 222 changes, the extraction unit 223 extracts a voice which is being reproduced at that time or extracts a factor changing the psychological state, from contents of the video. The extracted voice or factor is stored in the memory 202. Specifically, in a case where the reproduction unit 221 reproduces at least a voice, the extraction unit 223 extracts a factor changing the psychological state of the user as the audience, from the contents of the voice which is being reproduced. The extraction unit extracts the factor as a keyword. In a case where the reproduction unit 221 reproduces at least a video, the extraction unit 223 extracts behavior of a calling counterpart as the utterer, as a keyword, from the contents of the video which is being reproduced. The behavior of the calling counterpart serves as the factor changing the psychological state of the user as the audience.

The transmission unit 224 transmits a video of the user obtained by imaging of the camera 207 and a voice of the user detected by the microphone 208, to the call terminal device 20 of the calling counterpart. The transmission unit 224 transmits feedback information to the call terminal device 20 of the calling counterpart as the utterer. In the feedback information, the psychological state of the user as the audience, which has been estimated by the estimation unit 222 is associated with the factor extracted by the extraction unit 223 as a keyword. The transmission unit 224 may associate the psychological state of the user as the audience, which has been estimated at the preset time interval with time point information at a time point at which the psychological state of the user as the audience has been estimated and/or key frame information of the video reproduced by the reproduction unit 221 and may transmit the resultant to the call terminal device 20 of the calling counterpart as the utterer.

The camera 207, the microphone 208, the biometric sensor 40, the thermal camera 60, and the depth camera 70 which are described above detect feature information indicating the psychological state of the user as the audience, who listens to a voice and/or watches a video of the calling counterpart as the utterer, which have been reproduced by the above reproduction unit 221. A wrist band type mounted on the wrist or the arm of the user is used as the biometric sensor 40. A biometric sensor of a type other than the wrist band type may be used as the biometric sensor 40 so long as the biometric sensor is brought into contact with a portion of the body of the user. The biometric sensor 40 detects biometric information of the skin potential, the skin resistance value, and the volumetric pulse wave (described as "the heart rate" below for the sake of simplicity), and the body temperature of the user. The biometric information may include a change of the value of the biometric information in the regular day and a change of the value of the biometric information per unit time in addition to the value of the biometric information at a time point at which the biometric sensor performs detection. The biometric information detected by the biometric sensor 40 is transmitted to the call terminal device 20 via the access point 50.

The thermal camera 60 detects the heat distribution of the face or the body of the user by detecting infrared rays emitted from the face or the body of the user. The thermal camera transmits the detected heat distribution as the biometric information, to the call terminal device 20 via the access point 50.

The depth camera 70 detects the movement of the body of the user in three dimensions. In particular, the depth camera 70 captures the movement of the body, for example, "being bent backward", "being bent forward", and "being raising a hand", based on changes of the position of the skeleton of the body of the user. The depth camera transmits the captured movement as external appearance information, to the call terminal device 20 via the access point 50.

Figure 4:
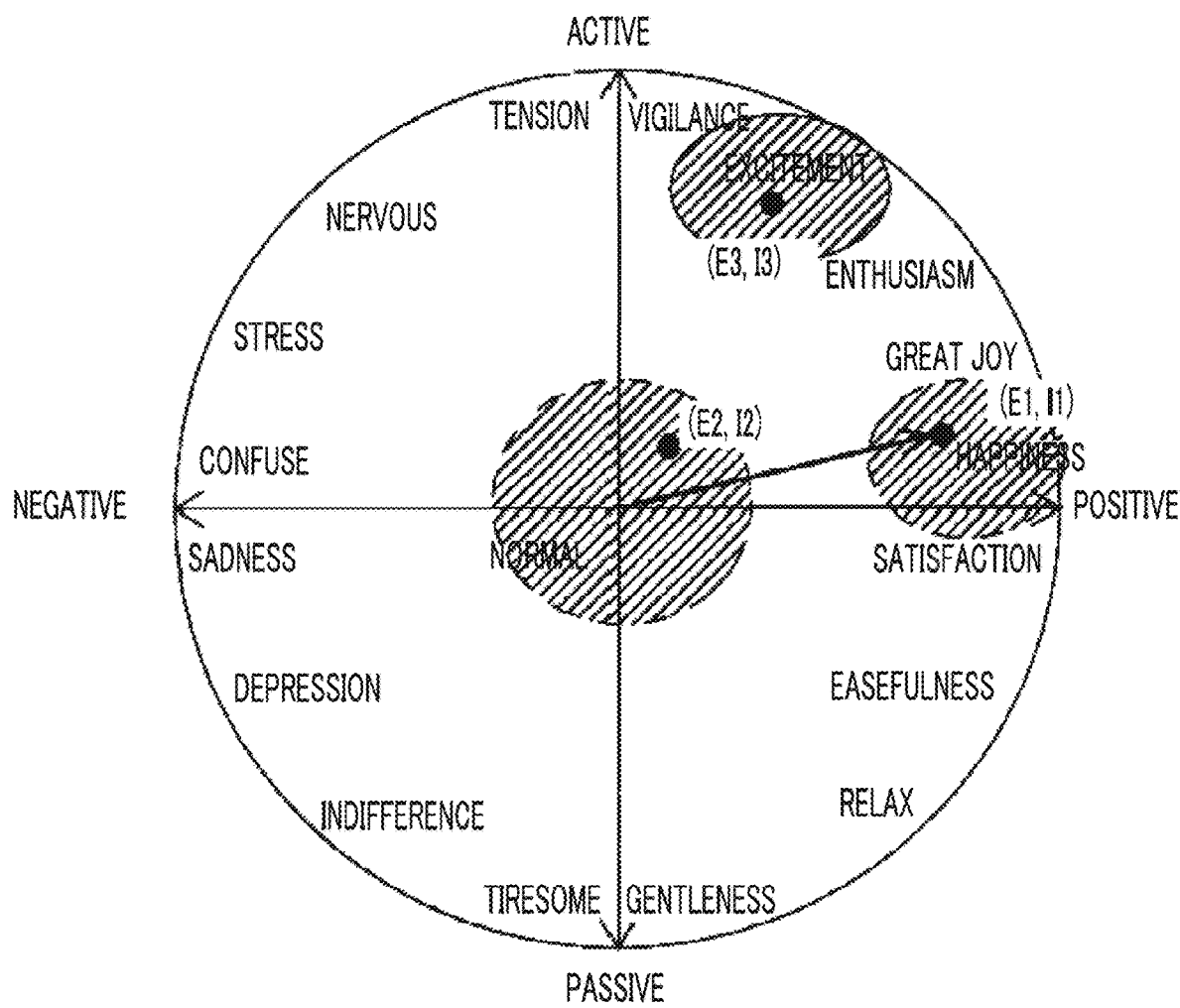
FIG. 4 is a diagram illustrating an example of an emotional map used in a case where an estimation unit 222 specifies a psychological state based on feature information indicating the psychological state of a user in the exemplary embodiment of the invention.

A method in which the above-described estimation unit 222 estimates the psychological state of a user based on feature information indicating the psychological state of the user, which is acquired from the camera 207, the microphone 208, the biometric sensor 40, the thermal camera 60, and the depth camera 70 will be described with reference to FIG. 4. FIG. 4 is a diagram illustrating an example of an emotional map used in a case where the estimation unit 222 specifies the psychological state based on the feature information indicating the psychological state of a user.

In the emotional map illustrated in FIG. 4, a horizontal axis indicates a feature amount E of external appearance information and a vertical axis indicates a feature amount I of biometric information. In the emotional map, various emotions (emotions such as "happiness" and "sadness") corresponding to the values in the horizontal axis and the vertical axis are assigned. The horizontal axis (Valence) of the emotional map indicates Positive and Negative. The vertical axis (Arousal) indicates Active and Passive. Although the horizontal axis indicates the feature amount of external appearance information and the vertical axis indicates the feature amount of biometric information, these axes are not limited to such feature amounts.

As described above, the external appearance information includes the facial expression obtained by using positions of landmarks of the face, such as eyebrows, cheeks, and lips of the user, and a motion (for example, "being bent backward", "being bent forward", and "being raising a hand") of the body of the user, which has been acquired by the depth camera 70. The positions of the landmarks of the face are obtained by imaging of the camera 207. The feature amount is preset corresponding to the external appearance information.

The biometric information includes the skin potential, the skin resistance value, the heart rate, and the body temperature of the user, which are detected by the biometric sensor 40, the heat distribution of the face or the body of the user, which is detected by the thermal camera 60, the tone of a voice of the user, which is detected by the microphone 208, for example. The feature amount is preset corresponding to the biometric information.

As described above, the feature amount of the external appearance information and the feature amount of the biometric information are determined based on plural elements. Thus, although expressing the emotional map by a two-dimensional figure as illustrated in FIG. 4 is not possible in practice, in the exemplary embodiment, for the sake of simplicity, the emotional map is simply expressed by a two-dimensional figure.

In the emotional map in FIG. 4, for example, a first area 401 is defined to correspond to "happiness", a second area 402 is defined to correspond to "normal", and a third area 403 is defined to correspond to "excitement". Here, in a case where the value E1 of the feature amount of the external appearance information and the value I1 of the feature amount of the biometric information are projected to the emotional map, it is estimated that the emotion of the user is included in the first area 401 and the psychological state of the user is "happiness".

Similarly, in a case where the value E2 of the feature amount of the external appearance information and the value I2 of the feature amount of the biometric information are projected to the emotional map, it is estimated that the psychological state of the user is "normal". In a case where the value E3 of the feature amount of the external appearance information and the value I3 of the feature amount of the biometric information are projected to the emotional map, it is estimated that the psychological state of the user is "excitement".

The estimation unit 222 uniquely specifies the current psychological state of the user in a manner that the feature amount E of the external appearance information and the feature amount I of the biometric information are projected on the emotional map based on the feature information which has been acquired from the camera 207, the microphone 208, the biometric sensor 40, the thermal camera 60, and the depth camera 70 and indicates the psychological state of the user.

Figure 5:
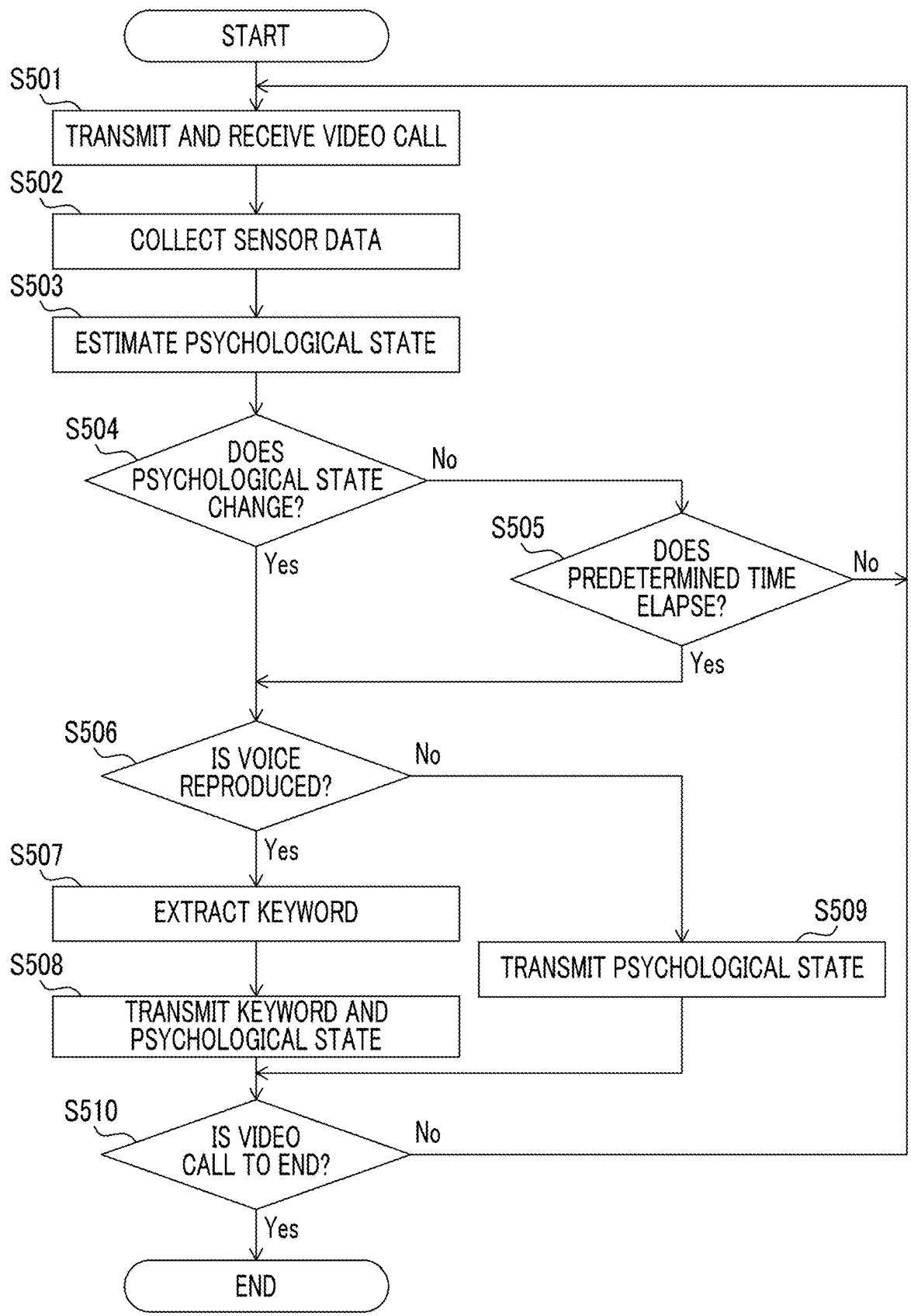
FIG. 5 is a diagram illustrating a flow of processing in a second call terminal device 20B of the video call system 10 in the exemplary embodiment of the invention.

Next, a flow of processing in the video call system 10 in the exemplary embodiment will be described with reference to FIG. 5. FIG. 5 is a diagram illustrating a flow of processing in the second call terminal device 20B of the video call system 10 in the exemplary embodiment. In a case where the outline of the flow of processing of video call is described, firstly, a first user A performs a video call with a second user B who is using the second call terminal device 20B, by using the first call terminal device 20A. Here, the first user A is an utterer and the second user B is an audience. The psychological state of the second user B as the audience changes depending on a video or a voice of the first user A as the utterer. In this case, the first user A may recognize the reaction of the second user B in a manner that the factor changing the psychological state of the second user B is extracted, as a keyword, from the contents of the voice or the video of the first user A and feedback of the extracted factor to the first call terminal device 20A is performed.

In the following descriptions, processing in the second call terminal device 20B will be described. In Step S501, the second call terminal device 20B performs a video call with the first call terminal device 20A. Specifically, the reproduction unit 221 of the second call terminal device 20B displays a video received from the first call terminal device 20A in the display 205 of the second call terminal device 20B and outputs a voice which has been received together, from the speaker 206. Thus, the reproduction unit enables the second user B to watch the video and listen to the voice. For example, it is assumed that the first user A utters the words of "quality improvement" to the second user B via the first call terminal device 20A at a time point T1 (13:00:01:000). The voice is reproduced to the second user B by the reproduction unit 221 of the second call terminal device 20B through the speaker 206 at a time point T2 (13:00:01:500), in a form of a voice of "quality improvement".

The transmission unit 224 of the second call terminal device 20B transmits a video of the user B obtained by imaging of the camera 207B and a voice of the user B detected by the microphone 208 to the first call terminal device 20A.

In Step S502, the feature amount of external appearance information of the user B, which has been detected by the camera 207 and the second depth camera 70B and the feature amount of biometric information of the user B, which has been detected by the microphone 208, the second biometric sensor 40B, and the second thermal camera 60B are acquired and are stored in the memory 202. Time point information T2 is given to feature information which is detected by the camera 207, the microphone 208, the biometric sensor 40, the thermal camera 60, and the depth camera 70 at a time point T2 (13:00:01:500) and indicates the psychological state of the user B. The estimation unit 222 calculates the feature amount of the external appearance information and the feature amount of the biometric information based on information of physical features, to which the same time point information has been given. The estimation unit gives time point information (T2) to the calculated feature amounts and stores the resultant in the memory 202.

In Step S503, the estimation unit 222 of the second call terminal device 20B estimates the psychological state of the user B at the time point T2, by using the above-described emotional map based on the feature amount of the external appearance information and the feature amount of the biometric information which have been stored in the memory 202.

In Step S504, the estimation unit 222 of the second call terminal device 20B determines whether or not the psychological state of the second user B has changed. In a case where it is determined that the psychological state has not changed, the process proceeds to Step S505. In a case where it is determined that the psychological state has changed, the process proceeds to Step S506.

In Step S505, the extraction unit 223 determines whether or not a predetermined time (for example, one second) elapses after the transmission unit 224 has transmitted the previous feedback information. In a case where it is determined that the predetermined time does not elapse, the process returns to Step S501 and video call processing and estimation processing of the psychological state of the second user B continue. In a case where it is determined that the predetermined time elapses, the process proceeds to Step S506.

In Step S506, the extraction unit 223 of the second call terminal device 20B determines whether or not a voice of the user A has been reproduced by the reproduction unit 221 at a time point (time point T2) of a psychological state of the user B, which has been estimated by the estimation unit 222. In a case where the voice of the user A has been reproduced, the process proceeds to Step S507. In a case where the voice of the user A has not been reproduced, the process proceeds to Step S509.

In Step S507, the extraction unit 223 converts the voice reproduced by the reproduction unit 221 at the time point T2 into a text, extracts a keyword from the text, and stores the extracted keyword in the memory 202.

In Step S508, the transmission unit 224 of the second call terminal device 20B transmits time point information (T2) in a case where the psychological state of the user B as the audience, which has been estimated by the estimation unit 222 has changed, that is, time point information at a time point at which the psychological state has been detected and the keyword has been reproduced. The transmission unit 224 transmits the time point information (T2) to the first call terminal device 20A together with the psychological state of the second user B, which has been estimated by the estimation unit 222 and the keyword (for example, "quality improvement") as the factor which has been extracted by the extraction unit 223 and has changed the psychological state of the second user B. Then, the process proceeds to Step S510.

In a case where the voice of the user A has not been reproduced by the reproduction unit 221 at the time point (time point T2) at which the second user B has been in the psychological state estimated by the estimation unit 222, in Step S506, the process proceeds to Step S509. The transmission unit transmits information of the psychological state estimated by the estimation unit 222 and the time point information (time point T2) at which the second user B is in the psychological state, in association with each other, to the first call terminal device 20A. Then, the process proceeds to Step S510.

In Step S510, the reproduction unit 221 determines whether or not the video call with the first call terminal device 20A ends. In a case where the video call is not ended, the process returns to Step S501 and the video call continues. In a case where a signal of ending the call is received from the first call terminal device 20A, or in a case where an operation of ending the call is performed by the second user B, the reproduction unit determines that the call ends. Thus, the reproduction unit ends transmission and reception of a video or a voice to and from the first call terminal device 20A and notifies the biometric sensor 40, the thermal camera 60, and the depth camera 70 to end the call. Thus, the process is ended.

FIG. 6 is a diagram illustrating contents of feedback information transmitted from the second call terminal device 20B to the first call terminal device 20A. The feedback information includes time point information, a keyword, key frame information, psychological state information, and ID information. For example, in the second calling base 100B, in a case where the estimation unit 222 estimates that the psychological state of the user B is "normal" at a time point of "13:00:00:500", time point information of "13:00:00:500", a keyword of " " (in this case, the keyword is not provided), key frame information of "130000000", psychological state information of "normal", and ID information of "h0001" are transmitted as feedback information from the second call terminal device 20B to the first call terminal device 20A. The key frame information indicates a key frame reproduced by the second call terminal device 20B at the time point of "13:00:00:500". The number of the key frame corresponds to the time point at which imaging has been performed by the first call terminal device 20A. That is, the key frame of "130000000" indicates that the frame has been imaged by the first call terminal device 20A at the time point of "13:00:00:000". The ID information is information indicating a user which is in the estimated psychological state.

Further, it is assumed that the estimation unit 222 in the second calling base 100B estimates that the psychological state of the user B is "excitement" at the time point of "13:00:01:500". It is assumed that, at this time, the keywords extracted by the extraction unit 223 are "quality improvement". In this case, time point information of "13:00:01:500", the keywords of "quality improvement", key frame information of "130001000", psychological state information of "excitement", and ID information of "h0001" are transmitted as feedback information from the second call terminal device 20B to the first call terminal device 20A.

Figure 7:
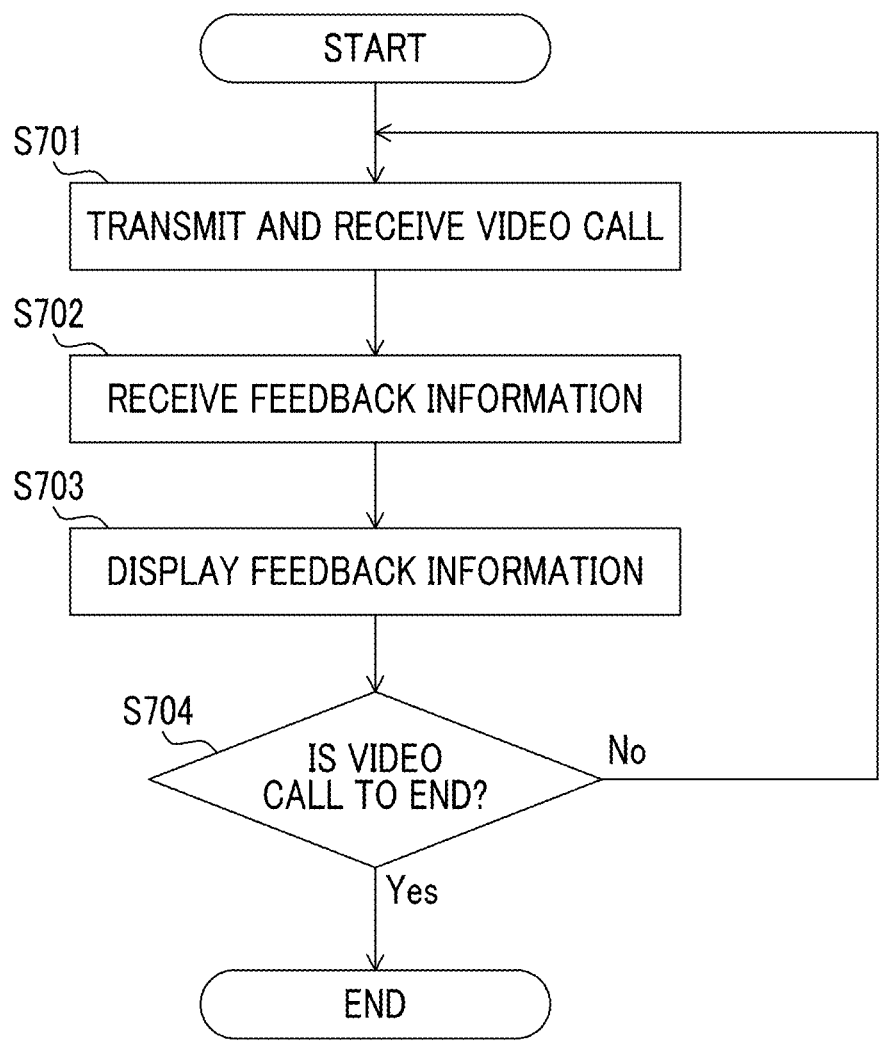
FIG. 7 is a flowchart illustrating a flow of processing in a case where the feedback information received from the second call terminal device 20B is displayed in the first call terminal device 20A in the exemplary embodiment of the invention.

A flow of processing in a case where the feedback information received from the second call terminal device 20B is displayed in the first call terminal device 20A will be described with reference to FIG. 7. FIG. 7 is a flowchart illustrating a flow of processing in a case where the feedback information received from the second call terminal device 20B is displayed in the first call terminal device 20A.

In Step S701, the first call terminal device 20A performs a video call with the second call terminal device 20B. Here, the first user A using the first call terminal device 20A is an utterer and the second user B using the second call terminal device 20B is an audience. Specifically, the transmission unit 224 of the first call terminal device 20A transmits a video of the user A obtained by imaging of the camera 207 and a voice of the user A detected by the microphone 208 to the second call terminal device 20B. For example, it is assumed that the first user A utters the words of "quality improvement" to the second user B via the first call terminal device 20A at a time point T1 (13:00:01:000). The voice is detected by the microphone 208 and transmitted to the second call terminal device by the transmission unit 224 together with a video of the first user A obtained by imaging of the camera 207. Then, the voice is reproduced to the second user B from the speaker 206 by the reproduction unit 221 of the second call terminal device 20B at the time point T2 (13:00:01:500), in a form of a voice of "quality improvement".

The reproduction unit 221 of the first call terminal device 20A displays a video received from the second call terminal device 20B in the display 205 of the first call terminal device 20A and outputs a voice which has been received together, from the speaker 206. Thus, the reproduction unit enables the first user A to watch the video and listen to the voice.

In Step S702, the first call terminal device 20A receives the feedback information transmitted from the second call terminal device 20B and temporarily stores the received feedback information in the memory 202.

Figure 8:
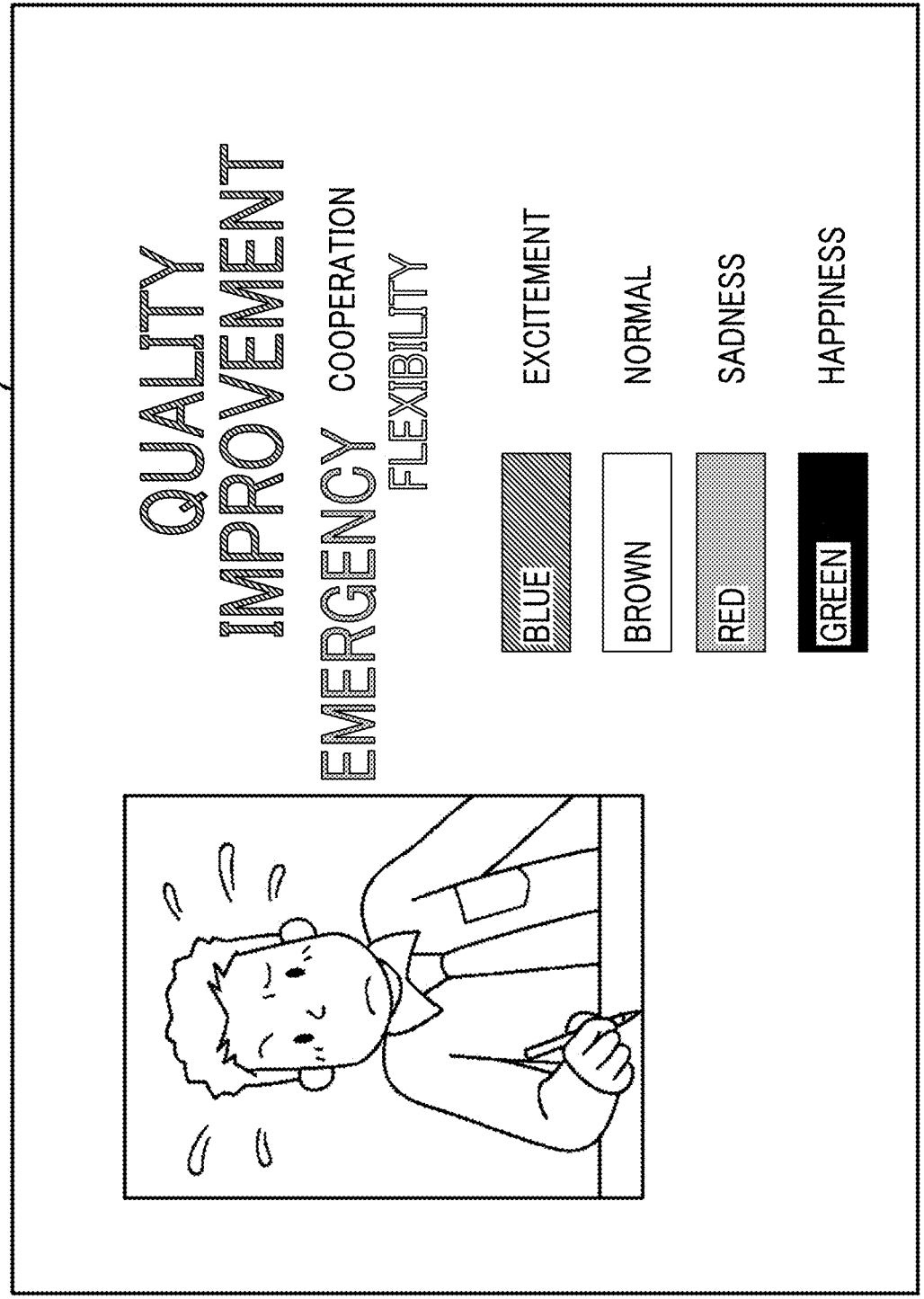
FIG. 8 is a diagram illustrating an example of displaying the feedback information in the exemplary embodiment of the invention.

In Step S703, the reproduction unit 221 of the first call terminal device 20A displays the received feedback information in the display 205. Specifically, the reproduction unit 221 displays the keyword included in the feedback information with a color corresponding to the psychological state associated with the keyword. FIG. 8 illustrates the example. FIG. 8 is a diagram illustrating an example of displaying the feedback information. In FIG. 8, for example, a blue color is assigned to "excitement", a brown color is assigned to "normal", a red color is assigned to "sadness", and a green color is assigned to "happiness". "Quality improvement" as the keywords received from the second call terminal device 20B is displayed in the display 205 of the first call terminal device 20A by the blue color. Thus, it is understood that the psychological state of the second user B in a case where the second user B as the audience listens to the words of "quality improvement", which has been uttered by the first user A as the utterer becomes a state of "excitement".

Similarly, in FIG. 8, the keyword of "emergency" is displayed in the display 205 of the first call terminal device 20A by the red color. Thus, it is understood that the psychological state of the second user B in a case where the second user B as the audience listens to the word of "emergency", which has been uttered by the first user A as the utterer becomes a state of "sadness".

The reproduction unit 221 displays the keyword included in the feedback information so as to become smaller as time elapses from start of displaying the keyword. For example, in FIG. 8, the keywords of "quality improvement" are displayed by a large font, but the keyword of "emergency" is displayed by a small font. This indicates that displaying the keywords of "quality improvement" just starts and indicates that time elapses from the start of displaying the keyword of "emergency".

In Step S704 in FIG. 7, the reproduction unit 221 determines whether or not the video call with the second call terminal device 20B ends. In a case where the video call does not end, the process returns to Step S701 and the video call continues. In a case where a signal of ending the call is received from the second call terminal device 20B, or in a case where an operation of ending the call is performed by the first user A, the reproduction unit determines that the call ends. Thus, the reproduction unit ends transmission and reception of a video or a voice to and from the second call terminal device 20B.

In the above-described example, an example in which the first user A using the first call terminal device 20A performs uttering as an utterer, the second call terminal device 20B estimates the psychological state of the second user B (audience) listening to the uttered word, associates the estimated psychological state of the second user and the keyword included in the word of the first user A with each other, performs feedback of the resultant of the association to the first call terminal device 20A as feedback information, and causes the first call terminal device 20A to display the feedback information is described. However, in the practical video call, communication is bidirectionally performed and the psychological states of both users change. Thus, the processing performed in the flowchart in FIG. 5 and the processing performed in the flowchart in FIG. 7 may be performed by both of the first call terminal device 20A and the second call terminal device 20B, respectively. Thus, the feedback information on the psychological state of the second user B for the word of the first user A may be transmitted to the first call terminal device 20A and displayed, and the feedback information on the psychological state of the first user A for the word of the second user B may be transmitted to the second call terminal device 20B and displayed.

In a case where the reproduction unit 221 reproduces at least a video, the extraction unit 223 may extract behavior of the utterer as the factor changing the psychological state of the audience, from the contents of the video which is being reproduced, as the keyword. The transmission unit 224 may transmit the psychological state of the audience estimated by the estimation unit 222 and the keyword extracted by the extraction unit 223 in association with each other, to the call terminal device 20 on the utterer side.

For example, it is assumed that, in a case where the audience of the second call terminal device 20B looks at the behavior of "nodding the head" of the utterer of the first call terminal device 20A, the psychological state of the audience becomes a state of "sadness". In this case, the extraction unit 223 of the second call terminal device 20B on the audience side extracts the keyword of "nodding the head" based on the behavior of the utterer as the factor changing the psychological state of the audience, from the contents of the video which are being reproduced. The transmission unit 224 transmits the psychological state of "sadness" of the audience and the keyword of "nodding the head" in association with each other, to the first call terminal device 20A on the utterer side.

Further, in a case where a communication speed between the call terminal devices 20 is equal to or smaller than a predetermined setting value, the transmission unit 224 may associate the psychological state of the audience estimated by the estimation unit 222 with the keyword as the factor changing the psychological state of the audience, which has been extracted by the extraction unit 223, a keyword which has been extracted at each preset time interval and indicates the contents of the voice of the utterer, or a keyword which has been extracted from the contents of the video and indicates the behavior of the utterer and may transmit the resultant of the association to the call terminal device 20 on the utterer side. In this case, even in a case where a video call is performed between the call terminal device 20 with high quality at first, but the communication speed decreases in the process of the video call and an image of the face of the counterpart is not clear, feedback information regarding the reaction of the counterpart to the word of the utterer is displayed in the display 205 of the call terminal device 20 on the utterer side.

In a case where the video of the audience, which is reproduced by the reproduction unit 221 of the call terminal device 20 that receives feedback information (that is, on the utterer side) has a resolution which is equal to or lower than a preset resolution, the transmission unit 224 of the call terminal device 20 on the audience side may transmit the psychological state of the audience estimated by the estimation unit 222 and the keyword extracted by the extraction unit 223, in association with each other, to the call terminal device 20 on the utterer side. In this case, even in a case where the face of the counterpart is not clear and reading the facial expression is not possible, feedback information regarding the reaction of the counterpart to the own word is displayed in the display 205 of the call terminal device 20 on the utterer side.

In a case where the reproduction unit 221 of the call terminal device 20 that receives feedback information (that is, on the utterer side) reproduces only the voice of the audience to the utterer, the transmission unit 224 of the call terminal device 20 on the audience side may transmit the psychological state of the audience estimated by the estimation unit 222 and the keyword extracted by the extraction unit 223, in association with each other, to the call terminal device 20 on the utterer side.

In a case where the reproduction unit 221 of the call terminal device 20 that receives feedback information (that is, on the utterer side) does not reproduce the video of the audience to the utterer, the transmission unit 224 of the call terminal device 20 on the audience side may transmit the psychological state of the audience estimated by the estimation unit 222 and the keyword extracted by the extraction unit 223, in association with each other, to the call terminal device 20 on the utterer side.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication device comprising:
   a communication interface;
   a processor, configured to:
     reproduce a voice and/or a video received from a device of an utterer through the communication interface;
     acquire feature information indicating a psychological state of an audience who is listening to the voice and/or watching the video of the utterer, wherein the feature information further comprises a change of a value of biometric information per unit time in addition to a value of the biometric information at a time point detected by a biometric sensor;
     estimate the psychological state of the audience based on the feature information;
     extract a factor changing the psychological state, from contents of the voice or the video which are being reproduced at a time point at which the psychological state of the audience, wherein the factor changing the psychological state is a keyword indicating the contents of the voice of the utterer or a keyword indicating a behavior of the utterer from the contents of the video of the utterer, wherein when the factor is the keyword indicating the voice of the utterer, the keyword is extracted from texts converted from the voice of the utterer; and
     transmit the psychological state of the audience and the factor in association with each other, to the device of the utterer through the communication interface, wherein the psychological state of the audience and the keyword are displayed on the device of the utterer.

2. The communication device according to claim 1,
wherein, in a case where at least the voice is reproduced,
the processor extracts the factor changing the psychological state of the audience, from the contents of the voice which is being reproduced, as the keyword, and
the processor transmits the psychological state of the audience and the keyword in association with each other, to the device of the utterer through the communication interface.

3. The communication device according to claim 1,
wherein, in a case where at least the video is reproduced,
the processor extracts the behavior of the utterer as the factor changing the psychological state of the audience, from the contents of the video which is being reproduced, as the keyword, and
the processor transmits the psychological state of the audience, which is estimated by the estimation section, and the keyword in association with each other, to the device of the utterer through the communication interface.

4. The communication device according to claim 2,
wherein, in a case where at least the video is reproduced,
the processor extracts the behavior of the utterer as the factor changing the psychological state of the audience, from the contents of the video which is being reproduced, as the keyword, and
the processor transmits the psychological state of the audience and the keyword in association with each other, to the device of the utterer through the communication interface.

5. The communication device according to claim 1,
wherein, in a case where a communication speed with the device of the utterer is equal to or smaller than a predetermined setting value, the processor transmits the psychological state of the audience and the factor in association with each other, to the device of the utterer through the communication interface.

6. The communication device according to claim 2,
wherein, in a case where a communication speed with the device of the utterer is equal to or smaller than a predetermined setting value, the processor transmits the psychological state of the audience and the factor in association with each other, to the device of the utterer through the communication interface.

7. The communication device according to claim 3,
wherein, in a case where a communication speed with the device of the utterer is equal to or smaller than a predetermined setting value, the processor transmits the psychological state of the audience and the factor in association with each other, to the device of the utterer through the communication interface.

8. The communication device according to claim 4,
wherein, in a case where a communication speed with the device of the utterer is equal to or smaller than a predetermined setting value, the processor transmits the psychological state of the audience and the factor in association with each other, to the device of the utterer through the communication interface.

9. The communication device according to claim 1,
wherein the processor transmits time point information in a case where the psychological state of the audience changes, to the device of the utterer together with the factor through the communication interface.

10. The communication device according to claim 1,
wherein the processor transmits frame information of the video reproduced in a case where the psychological state of the audience changes, to the device of the utterer together with the factor through the communication interface.

11. The communication device according to claim 1,
wherein the processor estimates the psychological state of the audience at each preset time interval, extracts the keyword indicating the contents of the voice of the utterer or the keyword indicating the behavior of the utterer from contents of the video at each time interval, and
the transmission section transmits the psychological state of the audience and the keyword in association with each other to the device of the utterer through the communication interface.

12. The communication device according to claim 11,
wherein the processor transmits the psychological state of the audience, which is estimated at each preset time interval and is associated with time point information at a time point at which the psychological state of the audience has been estimated and/or frame information of the video, to the device of the utterer through the communication interface.

13. A communication system comprising:
a first communication device including:
 a first display;
 a first communication interface;
 a first processor, configured to:
  acquire a voice or a video of a first user;
  transmit the voice or the video which is acquired through the first communication interface; and
  display received feedback information on the first display and reproduce a voice and/or a video of a second user to the first user; and
a second communication device including:
 a second communication interface;
 a second processor, configured to:
  reproduce the voice and/or the video received from the first communication device to the second user through the communication interface,
  acquire feature information indicating a psychological state of the second user listening to the voice and/or watching the video of the first user, wherein the feature information further comprises a change of a value of biometric information per unit time in addition to a value of the biometric information at a time point detected by a biometric sensor;
  estimate the psychological state of the second user based on the feature information;
  extract a factor changing the psychological state from contents of the voice and/or the video which are being reproduced at a time point at which the psychological state of the second user changes, wherein the factor changing the psychological state is a keyword indicating the contents of the voice of the first user or a keyword indicating a behavior of the first user from the contents of the video of the first user, wherein when the factor is the keyword indicating the voice of the utterer, the keyword is extracted from texts converted from the voice of the utterer; and
  transmit the psychological state of the second user and the factor in association with each other, as feedback information, to the first communication device through the communication interface,
wherein the first processor displays the psychological state of the audience and the keyword on the first display.

14. The communication system according to claim 13, wherein, in a case where a communication speed between the first communication device and the second communication device is equal to or smaller than a predetermined setting value, the second processor transmits the psychological state of the second user and the factor in association with each other, to the first communication device through the second communication interface.

15. The communication system according to claim 13, wherein, in a case where the video of the second user, which is reproduced by the first communication device has a resolution which is equal to or lower than a preset resolution, the second processor transmits the psychological state of the second user and the factor in association with each other, to the first communication device through the second communication interface.

16. The communication system according to claim 13, wherein, in a case where the first communication device reproduces only a voice of the second user to the first user, the second processor transmits the psychological state of the second user and the factor in association with each other, to the first communication device through the second communication interface.

17. The communication system according to claim 13, wherein, in a case where the first communication device does not reproduce the video of the second user to the first user, the second processor transmits the psychological state of the second user and the factor in association with each other, to the first communication device through the second communication interface.

18. The communication system according to claim 13, wherein the first processor displays the factor received from the second communication device, with a color corresponding to the psychological state associated with the factor on the first display.

19. The communication system according to claim 18, wherein the first processor displays the factor on the first display in a manner that the displayed factor becomes smaller as time elapses from start of displaying the factor.

20. A non-transitory computer readable medium storing a program causing a computer constituting a communication device that transmits and receives a voice and/or a video to and from a device of an utterer, to execute a process, the process comprising:
 displaying the received feedback information and reproducing the received voice and/or video;
 acquiring feature information indicating a psychological state of an audience listening to a voice and/or watching a video of the utterer, which are reproduced, wherein the feature information further comprises a change of a value of biometric information per unit time in addition to a value of the biometric information at a time point detected by a biometric sensor;
 estimating the psychological state of the audience based on the acquired feature information;
 extracting a factor changing the psychological state from contents of the voice or the video which is being reproduced at a time point at which the estimated psychological state of the audience changes, wherein the factor changing the psychological state is a keyword indicating the contents of the voice of the utterer or a keyword indicating a behavior of the utterer from the contents of the video of the utterer, wherein when the factor is the keyword indicating the voice of the utterer, the keyword is extracted from texts converted from the voice of the utterer; and
 transmitting the estimated psychological state of the audience and the extracted factor in association with each other, as feedback information, to the device of the utterer, wherein the psychological state of the audience and the keyword are displayed on the device of the utterer.

* * * * *